Jan. 29, 1946.  R. W. ECOFF  2,393,600
THREAD CUTTING MACHINE
Filed July 27, 1944   3 Sheets-Sheet 1

INVENTOR.
Roy W. Ecoff
BY
Hyde and Meyer
ATTORNEYS.

Jan. 29, 1946.   R. W. ECOFF   2,393,600
THREAD CUTTING MACHINE
Filed July 27, 1944   3 Sheets-Sheet 2

INVENTOR.
Roy W. Ecoff
BY
Hyde and Meyer
ATTORNEYS.

Jan. 29, 1946. R. W. ECOFF 2,393,600
THREAD CUTTING MACHINE
Filed July 27, 1944 3 Sheets-Sheet 3
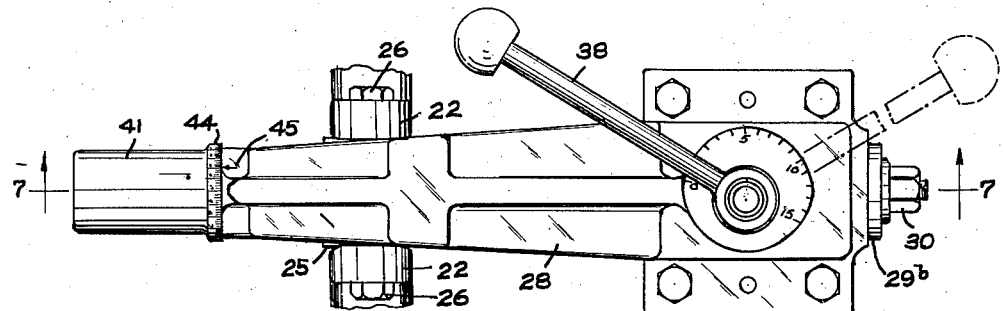
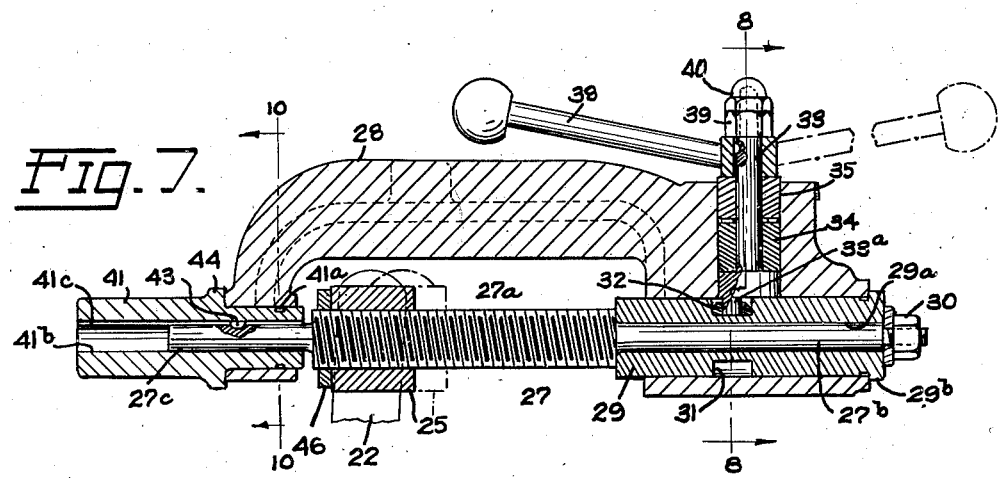
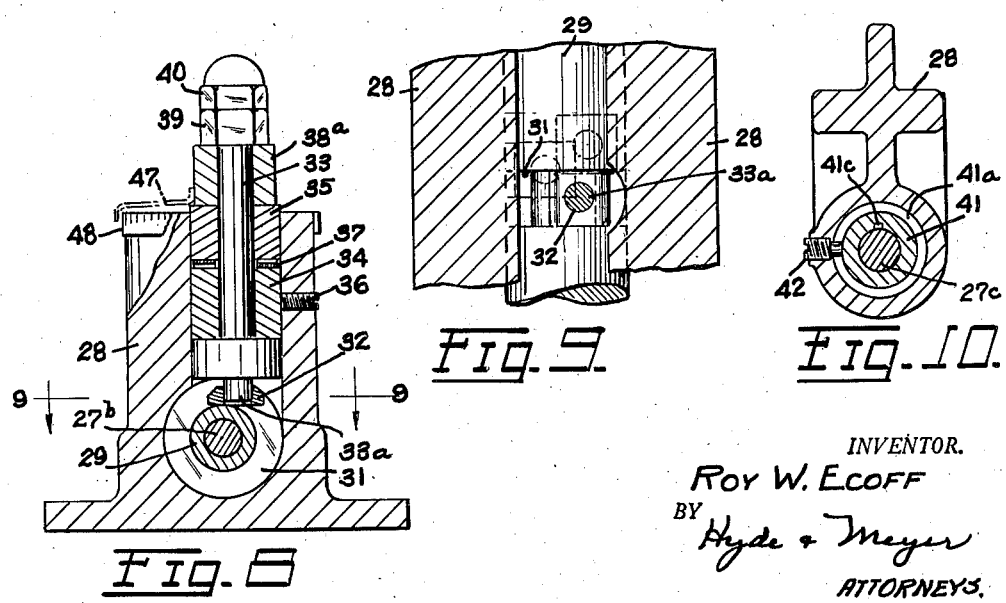
INVENTOR.
Roy W. Ecoff
BY Hyde & Meyer
ATTORNEYS.

Patented Jan. 29, 1946

2,393,600

UNITED STATES PATENT OFFICE 2,393,600

THREAD CUTTING MACHINE

Roy W. Ecoff, Cleveland, Ohio, assignor to The Hill Acme Company, Cleveland, Ohio, a corporation of Ohio Application July 27, 1944, Serial No. 546,870

6 Claims. (Cl. 10—95)

This invention relates to improvements in feed means for a thread-cutting die head.

One of the objects of the present invention is to provide a die head of the type in which die chasers are movable toward and away from the axis of the work piece being threaded and wherein novel feed means is provided for controlling the position of the chasers during a thread-cutting operation. The invention provides means for feeding the chasers inwardly by roughly selective steps together with a fine micrometer adjustment of the final position of the cutting dies.

My invention also provides means visible to the operator for indicating the various adjusted cuts as they are made.

Another object of the present invention is to provide a thread-cutting die head adaptable for production work on repetitive thread-cutting operations whereby an unskilled operator can produce accurate threads after the machine is once set up.

Other objects and advantages of the invention will be apparent from the accompanying drawings and descriptions, and the essential features will be set forth in the claims.

In the drawings,

Fig. 6 is a fragmental top plan view of the device of Fig. 1;

Fig. 7 is a sectional view taken along the line 7—7 of Fig. 6;

Figs. 8 and 10 are sectional views taken along similarly numbered lines of Fig. 7; while, Fig. 9 is a sectional view taken along the line 9—9 of Fig. 8.

Figure 1:
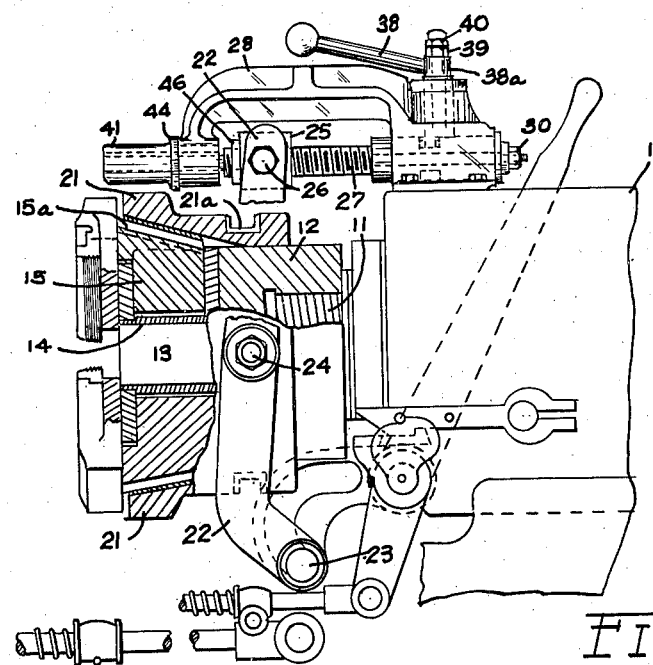
Fig. 1 is a side elevation of a die head equipped with my improved feeding means, portions of the die head being broken away to show the parts in central longitudinal section so that the structure is more clearly understood.
Figure 2:
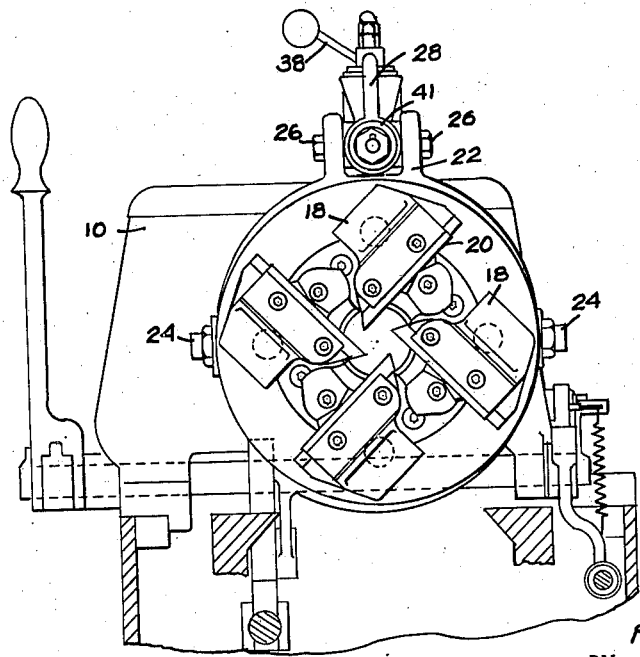
Fig. 2 is a front elevation of the die head with the bed of the machine cut through in section.
Figure 3:
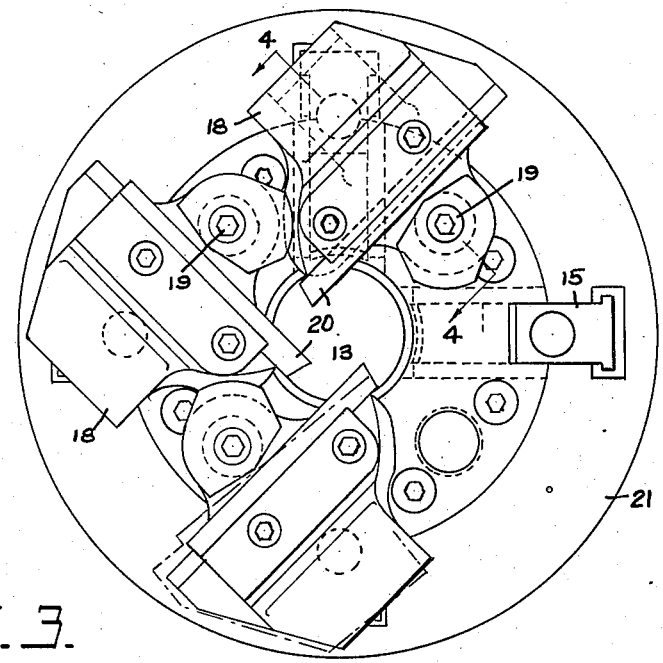
Fig. 3 is an enlarged front elevation of the head with one of the die holders removed.
Figure 5:
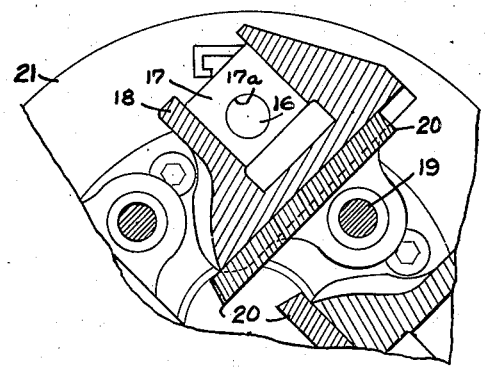
Fig. 5 is a partial sectional view taken along the line 5—5 of Fig. 4.
Figure 4:
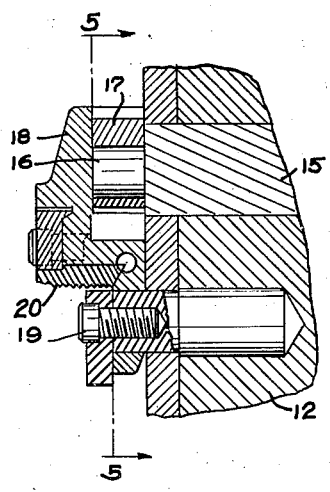
Fig. 4 is a partial sectional view taken along the line 4—4 of Fig. 3.

My improved feeding device may be utilized with various types of die heads, but I have chosen to illustrate the same as applied to the die head disclosed and claimed in United States Letters Patent No. 2,292,788, granted August 11, 1942, to Merle W. Lamprecht, to which patent reference may be made if further information is desired. Briefly the die head is shown assembled on a frame 10 having a rotatable spindle 11 on which is threaded a rotatable barrel 12. The barrel has a central opening 13 lined with a hardened steel bushing 14 for the reception of stock to be threaded. The barrel 12 is generally cylindrical and is provided at its forward end with four radially extending pockets in each of which is slidably mounted a die slide 15. Each slide has a forwardly extending pin 16 which enters a suitable bore 17a in a block 17 which in turn is slidably mounted in a slot of a die holder 18. Each die holder is pivotally mounted on the head by a pivot pin 19 whereby the chasers 20, of which there are four, one on each holder, may have their cutting edges moved radially with respect to the work piece for thread-cutting operations. This radial position of the dies is controlled by the position of the die slides 15. The radially outermost faces of these slides are inclined toward the axis of the head from the front to the rear of each slide as indicated at 15a. A die ring 21 which embraces the barrel 12 and is slidable axially therealong has T-shape pockets for receiving the radially outermost portions of the slides 15. Each of these pockets has an inclined face complementary to the surface 15a. It follows from this construction that as slide 21 moves toward the left as viewed in Fig. 1, the chasers close inwardly, whereas when the slide 21 moves toward the right, the chasers are opened.

The position of the die ring 21 is controlled by means of a yoke 22 which is pivotally mounted on the main frame at 23. This yoke passes around opposite sides of the ring 21 and carries pins 24 which engage in an annular groove 21a in ring 21. The upper end of the yoke 22 carries a nut 25 which is mounted in the yoke on trunnion pins 26. This nut is threaded on a threaded portion 27a of feed shaft 27. This shaft is mounted for reciprocation endwise in a bracket 28 which is connected with the frame 10.

The right-hand end of feed shaft 27 as viewed in Fig. 7 has a reduced cylindrical portion 27b which is rotatably mounted in a bore 29a of sleeve 29 which in turn is embraced in a suitable bore in bracket 28. At its right-hand end, the sleeve 29 has a stop shoulder 29b, and the sleeve is held on shaft 27 by means of nut 30 which is threaded on the right-hand end of the shaft portion 27b. An annular groove 31 extends around sleeve 29 at its mid portion, and a box 32 slidable in this groove is connected with a manual feeding lever.

The manual feed means comprises a shaft 33, mounted for oscillation with its axis at right angles to the axis of shaft 27. The shaft 33 is preferably mounted in collars 34 and 35 which fit in a suitable bore in the bracket 28 as best seen in Figs. 7 and 8. The collar 34 is held in position by set screw 36. The collar 35 is yieldably urged away from the collar 34 by a spring washer 37. Keyed to the upper end of shaft 33 is the lever 38 by which shaft 33 may be oscillated. A nut 39 and a lock nut 40 are threaded on shaft 33 to hold the parts thereon assembled. By adjusting nut 39, the tension of spring washer 37 is varied to vary the ease of oscillation of lever 38. On the lower end of shaft 33 is mounted eccentrically pin 33a which enters a suitable bore in box 32. Thus by oscillation of lever 38 between the dot-dash position of Figs. 6 and 7 and the full line position therein, the pin 33a is carried from right to left as viewed in Fig. 7 or from its dot-dash position to its full line position as shown in Fig. 9. This causes feed shaft 27, nut 25, and yoke 22 to move from the dot-dash position to the full line position of Fig. 7 and moves the cutting chasers from open position to closed position.

The position of nut 25 on threaded portion 27a of the feed shaft must be nicely adjusted so that when the parts are in the full line position of Fig. 7, the thread-cutting chasers will be in the desired radially innermost position for the finishing cut. Therefore, the position of nut 25 on the threaded portion 27a must be closely adjusted. To this end, a micrometer adjusting knob 41 is rotatably mounted in bracket 28 and is held therein by means of a shoulder screw 42 (Fig. 10) which enters an annular groove 41a extending around knob 41. A reduced cylindrical end portion 27c of shaft 27 slidably enters bore 41b of knob 41. A Woodruff key 43 carried by shaft portion 27c rides in key-way 41c in the knob 41 so that shaft 27 is slidable axially in knob 41, but the shaft and knob rotate together. The knob 41 carries indicia 44, and the bracket 28 carries a coacting pointer 45 (Fig. 6). By turning knob 41, the nut 25 is moved along the threaded portion 27a because the nut is held from turning by its mounting on yoke 22. When the proper position of nut 25 has been selected, it is generally locked in position on the threaded portion 27a by means of lock nut 46, particularly where a large number of identical work pieces are to be produced.

My invention is very useful where machines of the type described are adapted to be set up by experienced operators for the production of a large number of identical pieces by relatively unskilled operators. In such a case, the skilled operator adjusts the position of nut 25 on the feed shaft 27 so that when lever 38 is in its full line position of Figs. 6 and 7 with stop shoulder 29b tightly against the bracket 28, the chasers 20 will be in the desired radially innermost position for the finishing cut of the thread. The unskilled operator then inserts a work piece in the opening 13 of the die head after moving lever 38 to a suitable open position (toward the dot-dash position of Figs. 6 and 7) to permit the work piece to enter between the chasers 20. This position of lever 38 is indicated by means of a pointer 47 fastened to the hub 38a of lever 38. This pointer moves over a scale 48 located on a portion of bracket 28 concentric with shaft 33. This scale is preferably positioned actually as shown in Fig. 8, but the indicia are shown as visible from above in the top plan view of Fig. 6 for a better understanding of the following operation. Say, for instance, that the operator finds that the lever 38 should be moved clockwise from the position of Fig. 6 until pointer 47 is at the number ten on scale 48 at which time the work piece may be entered in the die head opening 13. Many times the threading operation is best performed in two or three bites, and, therefore, a skilled operator will suggest that the unskilled operator feed the thread-cutting chasers radially inwardly for the first bite by moving lever 38 counter-clockwise from the dot-dash position of Fig. 6 until pointer 47 is at the number five on scale 48. After holding this position long enough for the cutters to enter the work piece at the depth set, the operator will then move lever 38 further in a counter-clockwise direction to the full line position of Figs. 6 and 7, and this position is definitely set by the stop flange or shoulder 29b coming up against the bracket 28. This position of the chasers is then held until the finished thread is cut. Thereupon the operator again throws lever 38 toward the dot-dash position to open the dies. The operator removes the threaded work piece and inserts a new work piece for a repetition of the operation. Obviously, instead of the moves from ten to five to zero, other specific positions of the cutting chasers may be selected at will, but my improved device makes it possible for an unskilled operator to make approximately the same cuts time after time on production work without any knowledge of threading machines simply by following the position of pointer 47 on the scale 48.

What I claim is:

1. In a threading machine having a die head adapted to receive a work piece axially thereof, and having cutting chasers in said head movable generally radially thereof to act upon the workpiece, a die ring controlling the position of said chasers, a feed member controlling said die ring and mounted for sliding reciprocation, and an operative connection between said ring and said member adjustably mounted on said member.

2. In a threading machine having a die head adapted to receive a work piece axially thereof, and having cutting chasers in said head movable generally radially thereof to act upon the work piece, means limiting the depth of thread cut by said chasers, means controlling the position of said chasers, a member for feeding said chasers radially inward and mounted for sliding reciprocation, an operative connection between said controlling means and said member adjustably mounted on said member, quick-acting manual means for reciprocating said member, and indicia for indicating various positions of said manual means corresponding to points intermediate the open and closed positions of said chasers.

3. In a threading machine having a die head adapted to receive a work piece axially thereof, and having cutting chasers in said head movable generally radially thereof to act upon the work piece, means controlling the position of said chasers, a feed member mounted for sliding reciprocation, an operative connection between said means and said member adjustably mounted on said member, a rotatable shaft positioned at right angles to the path of reciprocation of said feed member, and an eccentric on said shaft engaging said feed member in such a manner that shaft rotation causes member reciprocation.

4. In a threading machine having a die head adapted to receive a work piece axially thereof, and having cutting chasers in said head movable generally radially thereof to act upon the work piece, a die ring controlling the position of said chasers, a feed member controlling said die ring and mounted for sliding reciprocation, an operative connection between said ring and said member adjustably mounted on said member, means for reciprocating said feed member and stop means definitely limiting movement of said member in chaser closing direction.

5. In a threading machine having a die head adapted to receive a work piece axially thereof and having cutting chasers mounted in said head for movement generally radially of said head to act upon the work piece, a ring movable axially of said head for controlling the position of said chasers, means for moving said ring including a lever, a feed shaft mounted for sliding reciprocation endwise and having a threaded portion and having a cylinder secured thereto, a nut threaded on said threaded portion and held on said lever against rotation relative to said feed shaft, a frame, said cylindrical portion being slidable axially in said frame, a groove in said cylinder opening radially outwardly, a box slidable in said groove, an actuator shaft rotatably mounted in said frame at right angles to said feed shaft, and a pin mounted eccentrically on said actuator shaft and engaging said box.

6. In a threading machine having a die head adapted to receive a work piece axially thereof and having cutting chasers mounted in said head for movement generally radially of said head to act upon the work piece, a ring movable axially of said head for controlling the position of said chasers, means for moving said ring including a lever, a frame, an adjusting knob rotatably mounted in said frame and having an axially extending bore, a sleeve spaced from said knob and slidably positioned in said frame, said sleeve having a bore coaxial with said knob bore, a feed shaft having cylindrical end portions and an intermediate threaded portion, one of said end portions being rotatably received in said sleeve bore, means holding said sleeve against movement axially of said feed shaft, the other of said end portions being axially slidable in said knob bore and held against rotation relative thereto, a nut threaded on said threaded portion of said feed shaft and held on said lever against rotation relative to said feed shaft, a groove around said sleeve opening outwardly, a box slidable in said groove, an actuator shaft rotatably mounted in said frame at right angles to said feed shaft, and a pin mounted eccentrically on said actuator shaft and engaging said box.

ROY W. ECOFF.